UNITED STATES PATENT OFFICE.

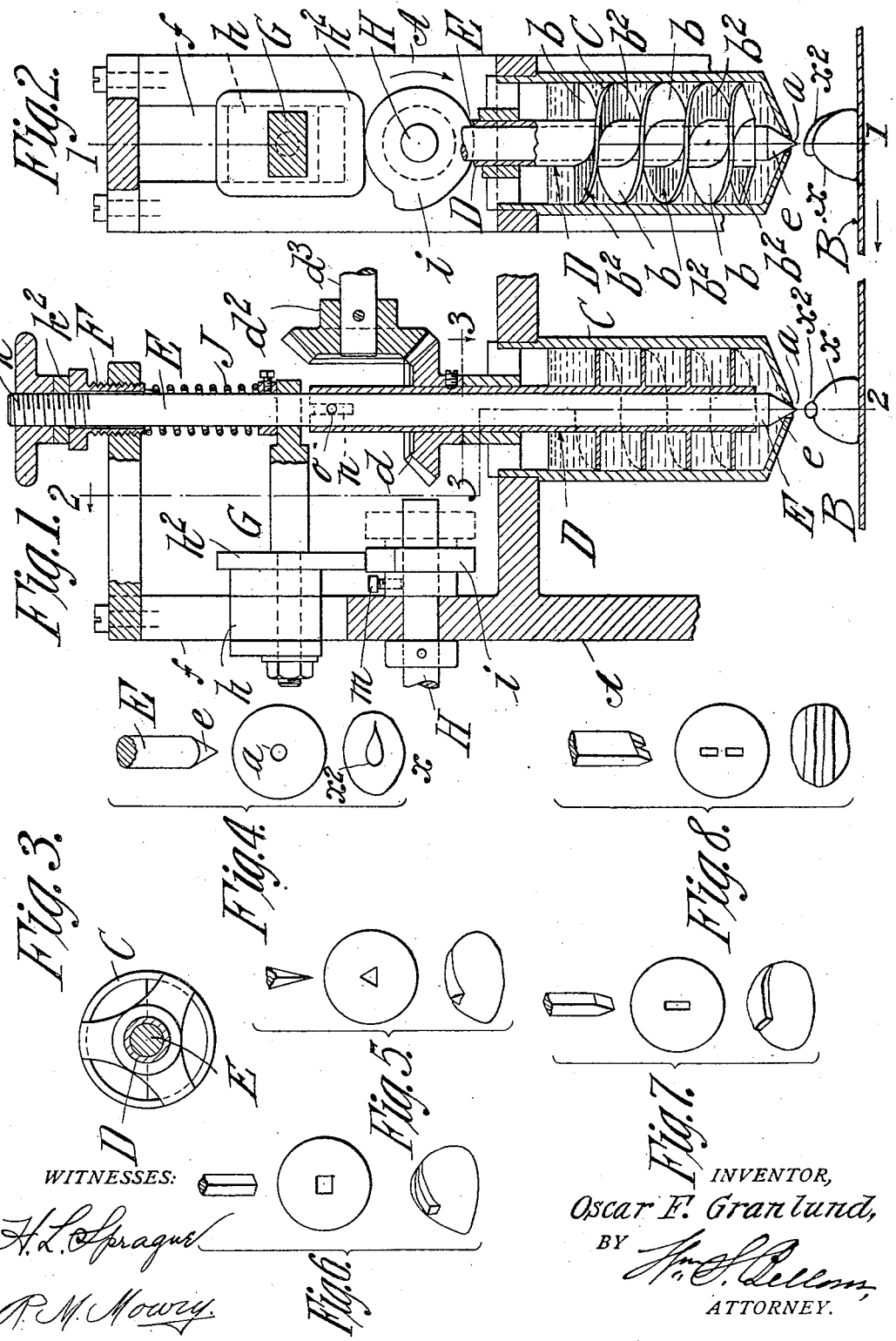

OSCAR F. GRANLUND, OF SPRINGFIELD, MASSACHUSETTS.

CONFECTIONERY-MACHINE.

941,070.    Specification of Letters Patent.    Patented Nov. 23, 1909.

Application filed May 12, 1909. Serial No. 495,560.

*To all whom it may concern:*

Be it known that I, OSCAR F. GRANLUND, a citizen of the United States of America, and resident of Springfield, in the county of Hampden and State of Massachusetts, have invented certain new and useful Improvements in Confectionery-Machines, of which the following is a full, clear, and exact description.

This invention relating to confectionery machinery especially pertains to an apparatus or mechanism for decorating pieces of confectionery which, in regularly spaced arrangement on a carrier therefor, are fed through the machine.

The invention comprises, in combination, with a confectionery supporting, movable carrier, a receptacle for semi-liquid decorating material, such as molten chocolate, located above the carrier, having an outlet opening in the bottom thereof and provided with a valve, and means for intermittently operating the valve whereby portions of the molten chocolate are delivered onto the top of each piece of candy, such, for instance, as a coated chocolate cream, to constitute a teat or mound thereon; and inasmuch as it is desired that the portion of the molten chocolate deposited on the piece shall be of considerable size at one portion and be gradually tapered to terminate in a point, provision is made in the present apparatus so that the valved opening is caused to be increasingly contracted to diminish the freedom of delivery of the semi-liquid chocolate whereby the considerably larger part of the decorating material initially delivered constitutes the most bulky portion of the decorating teat or mound, while the lastly delivered part of such material constitutes the attenuated portion of the decoration.

The invention, furthermore, comprises means whereby the molten liquid is delivered in a straight line or course vertically from the supply receptacle therefor.

The invention, furthermore, comprises the combinations and arrangements of parts and the constructions of certain of the parts for advantages as will hereinafter be set forth.

The improved apparatus is illustrated in the accompanying drawings in which:—

Figure 1 is a vertical sectional view centrally through the same; Fig. 2 is a vertical sectional view taken at right angles to Fig. 1, and as seen on line 2—2, Fig. 1; Fig. 3 is a horizontal section of a part of the apparatus on line 3—3, Fig. 1; Figs. 4, 5, 6, 7 and 8 are views in the nature of grouped diagrams for illustrating modifications in the forms of the decorations which may be acquired by the employment of this apparatus.

In the drawings,—A represents a frame constituting a portion of a confectionery machine, in which is comprised a carrier or apron B for chocolate creams or other pieces $x$ of confectionery, such carrier, as common in this general class of machines, having a movement horizontally for advancing the pieces.

C represents a receptacle for the molten liquid or other semi-liquid confectionery decorating material, the same being in the form of an upwardly open axially vertical cylindrical casing having an outlet opening $a$ centrally through its bottom, which, as shown, is downwardly convergent and has its location in suitable proximity to the carrier B.

D represents an axially vertical sleeve centrally within the receptacle and having its lower end terminating slightly above the outlet opening $a$; and this sleeve is provided with double helical feed blades or screws $b$, $b^2$, and the sleeve and its feed blades are revolved by means of a gear wheel $d$ affixed on the sleeve and driven by the gear wheel $d^2$ which meshes therewithin and which is on a shaft $d^3$, to which rotary motion is imparted by any suitable means.

E represents a stem fitting within and extending above and below the sleeve, the same having, in most cases, its lower end tapered, as indicated at $e$ to constitute a valve for the said outlet opening, which after having been raised to open position closes in such a manner as to increasingly contract and finally absolutely close the outlet opening. The upper portion of the said stem E plays and has bearings through an externally screw threaded bushing F in an upper portion of the frame; and at an intermediate portion thereof the stem has a transverse projection G, a portion $h$ of which has a sliding engagement in a straight sided vertical aperture $f$ of the frame, while with another portion, $h^2$, of said projection, a cam $i$ coacts,—said cam being detachably affixed on a horizontal shaft H, to which rotary motion may be imparted in any suitable manner.

J represents a spiral spring which is in compression between a suitable stop on the valve stem E and the lower end of the tubular bushing F, such spring in its reaction downwardly forcing the valve stem to close the outlet a after the valve has been opened by the working thrust of the cam; and the tension of this spring may be regulated by upwardly or downwardly adjusting the bushing sleeve F.

In the operation of the apparatus for providing on the top, and more or less down the side of a piece of confectionery a teat, such as indicated at $x^2$ in Figs. 1, 2 and 4, the outlet opening a in the receptacle being circular, and the valve constituting end of the stem being conical, the supply of molten chocolate is poured into the receptacle C and fed downwardly through the outlet opening by the screw blades $b$, $b^2$, in proper time, and firstly in considerable bulk and then in diminishing quantity as controlled by the valve, it being apparent that as the valve cone comes within the outlet opening a and descends therein, the semi-liquid material being delivered will become progressively (but, of course, within a very short period,) diminished and finally cut off to terminate in a point.

Experiment and demonstration have proved that by employing in the cylindrical receptacle C a screw having a single helical feed blade for the expulsion of the molten chocolate, or the like, from the receptacle, such material is delivered in a sinuous or cork-screw like course, which, in many instances, it is desirable shall be avoided; and the provision by me, as has been demonstrated, of a feed screw having pluralized helical blades insures a down feeding through the outlet opening of the receptacle of the material in a perfectly straight line; and in order to render fully apparent that the feeding device comprises double feed blades,—the importance of which has been above set forth,—the drawing, Fig. 1, indicates the one feed blade $b$ as unshaded, while the feed blade $b^2$ which has its helical course in the spiral channel constituted by the blade $b$ is shaded for the purpose of distinguishing the one blade from the other.

The valve is intermittently opened and closed in proper time with the successive positioning, under the receptacle outlet, of the pieces to be decorated and which are supported by and moved with the apron or carrier B.

Inasmuch as it may be desirable at times to utilize this apparatus for delivering a steady stream of the molten liquid, the valve stem may be elevated through means of the nuts $k$ and $k^2$ which engage its threaded upper extremity above the bushing F, the one $k$ being an adjusting and the other $k^2$ a locking nut.

When the nuts are turned to comparatively slightly, yet sufficiently, elevate the stem for fully opening the valve and holding the stem in such position, the cam $i$ is loosened from the shaft H by outwardly turning the set screw $m$, and the cam is slid along the shaft to be out of range with the projection $h^2$ appurtenant to the valve stem; and inasmuch as when a continuous stream of the material is to be delivered through the outlet opening when the valve is held raised, it is desirable that the valve stem be rotated to prevent the adherence at its lower end of the more or less sticky liquid, provision is made to insure such desired rotary movement of the valve stem from the rotative movement of the screw bladed sleeve; and on reference to Fig. 1, $n$ indicates a vertical slot in the sleeve, and $o$ indicates an aperture transversely through the valve stem at the location of said slot; and by the insertion of a pin detachably through the slot $n$ and through the cross hole in the stem, the parts are interlocked so that the latter will be rotated by the sleeve.

In diagrams, Figs. 4 to 8 inclusive, stems having valve ends of different cross sectional shapes, and structurally otherwise are shown in conjunction with the circles which represent the base of the receptacle in which are indicated outlet openings of different cross sectional shapes; while therebelow are representations of the confectionery pieces having decorations thereon such as would be imparted by the formations above referred to.

In Fig. 4 the outlet opening and valve are of triangular form, in Fig. 6 of square form, in Fig. 7 of rectangular form,—the valve being advantageously shaped, while in Fig. 8 a double shaped valve is indicated as coacting with the base of the receptacle for closing double outlet openings.

In Fig. 6 the valve is shown not tapered but of full size so as to give an abrupt cut-off for laying a cross sectionally square ridge on the top of the piece.

I claim:—

1. In an apparatus of the character described, the combination with a confectionery supporting, movable, carrier, of a receptacle for molten confectionery decorating material located above said carrier, having an outlet opening in the bottom thereof and a screw comprising double helical feeding blades axially located in said receptacle and in line with said outlet opening, and operative, because of the plural character of its helical feeding blades, to cause a discharging of the semi-liquid material from the receptacle down through said opening in a straight line.

2. In an apparatus of the character described, a receptacle for a confectionery decorating semi-liquid material having an opening centrally through its bottom, a sleeve concentrically and vertically within said receptacle having helical feeding blades, means for revolving said sleeve, and the blades carried thereby, a stem, located within said sleeve, having a tapered lower end operating as a valve for said outlet opening, and means for intermittently raising and lowering said stem.

3. In an apparatus of the character described, the combination with a movable confectionery supporting carrier, of a receptacle for a confectionery decorating semi-liquid material having an outlet opening centrally through its bottom, a sleeve concentrically and vertically within said receptacle, terminating above said outlet opening and having a helical feeding blade, means for revolving said sleeve and the blade carried thereby, a stem located within and extending below the lower end of said sleeve, having a tapered lower end operating as a valve for said outlet opening, and means for intermittently raising and lowering said stem.

4. In an apparatus of the character described, the combination with a movable, confectionery supporting carrier, of a receptacle for containing a confectionery decorating semi-liquid material having an outlet opening centrally through its bottom, a sleeve concentrically and vertically within said receptacle terminating above said outlet opening and having helical feeding blades, means for revolving said bladed sleeve, a stem within and extending above and below said sleeve, having a tapered lower end operating as a valve for said outlet opening and having a transversely extending projection above the sleeve, a rotary cam coacting with said projection for intermittently raising the stem, and a spring reacting downwardly on said stem.

5. In an apparatus of the character described, the combination with a movable confectionery supporting carrier, a receptacle for a confectionery decorating semi-liquid material having an outlet opening centrally through its bottom, a sleeve concentrically and vertically within said receptacle, terminating above said outlet opening and having a helical feeding blade, means for revolving said sleeve and the blade carried thereby, a stem located within and extending below the lower end of said sleeve, having a tapered lower end operating as a valve for said outlet opening, means for intermittently raising and lowering said stem relatively to the sleeve, and means for connecting the stem and sleeve whereby the revoluble movement of the sleeve causes a like movement of the stem.

6. In an apparatus of the character described, a receptacle for confectionery decorating material having an outlet opening centrally through its bottom, a sleeve concentrically and vertically within said receptacle terminating above said outlet opening and having a helical feeding blade and provided with a longitudinal slot therein, means for revolving said sleeve, a stem located within and extending above and below the ends of the sleeve, having a tapered lower end operating as a valve, means for intermittently raising and lowering said stem, means for elevating and sustaining the stem in an elevated position, and a detachable pin operable through the slot of the sleeve and through the stem for detachably connecting the stem to the sleeve whereby the sleeve imparts a rotative movement to the stem.

7. In an apparatus of the character described, a supporting frame and a receptacle containing confectionery decorating semi-liquid material having an outlet opening in its bottom, a sleeve axially vertical, centrally located in the receptacle and having helical feed blades, means for rotating the sleeve, a stem within the sleeve and extending above and below the same, having its lower end tapered to constitute a valve for said outlet opening, having its upper extremity screw threaded, and provided at an intermediate portion thereof with a transverse projection, a rotary cam coacting with said projection, a nut screw engaged on the upper extremity of the stem and operative to secure a vertical adjustment of the latter, and a spring reacting downwardly against the stem.

8. In an apparatus of the character described, a supporting frame and a receptacle for a semi-liquid confectionery decorating material having an outlet opening centrally through its bottom, an axially vertical sleeve centrally within the receptacle and provided with double helical feed blades, means for revolving the bladed sleeve, a stem fitting within and extending below and above the sleeve having its lower end tapered to constitute a valve for said outlet opening, having its upper extremity screw threaded and provided with a transverse projection, a rotary cam coacting with said projection, a spring exerting a downwardly reaction against the stem, a bushing screw engaged in, and vertically adjustable relatively to, the frame and engaging the spring, and a nut above said bushing screw engaging, and for vertically adjusting, said stem.

Signed by me at Springfield, Mass., in presence of two subscribing witnesses.

OSCAR F. GRANLUND.

Witnesses:
WM. S. BELLOWS,
G. R. DRISCOLL.